United States Patent Office 3,781,414
Patented Dec. 25, 1973

3,781,414
ORGOTEIN-POLYSTYRENE LATEX DIAGNOSTIC
FOR RHEUMATOID FACTOR
Wolfgang Huber, San Francisco, Calif., assignor to
Diagnostic Data, Inc., Mountain View, Calif.
No Drawing. Continuation-in-part of abandoned application Ser. No. 708,492, Feb. 27, 1968. This application Aug. 31, 1971, Ser. No. 176,731
Int. Cl. G01n 31/00, 33/16
U.S. Cl. 424—12
10 Claims

ABSTRACT OF THE DISCLOSURE

The sensitivity of polystyrene latex susceptible to coagulation by rheumatoid factor-containing serum is increased by a mixture of such latex and orgotein.

This application is a continuation-in-part of application Ser. No. 708,492, filed Feb. 27, 1968, now abandoned.

BACKGROUND OF THE INVENTION

This invention relates to the coagulation of polystyrene latex with rheumatoid factor (RF), more particularly to means for increasing the sensitivity of the latex to such coagulation; to improved means for detecting rheumatoid factor in serum; to means employing such latex for detecting and/or assaying the biological activity of protein samples comprising or consisting essentially of orgotein, to novel RF coagulable protein coated polystyrene latices, and to novel RF detection means.

The styrene latex

U.S. Pat. 3,088,875 claims an immunological diagnostic reagent which uses a polystyrene latex coated with normal 7-S gamma-G globulin to detect, by the coagulation of the latex, rheumatoid factor (RF), a 19-S gamma-M protein, in human serum. The present invention, in one embodiment, uses the same starting (bare or uncoated) latex. In another embodiment, it uses the latex-gamma globulin product of that patent.

The polymer particles of styrene in the dispersed phase of the polystyrene latex suspension ordinarily average less than one micron in diameter, e.g., about 0.1 to 0.85 microns, preferably about 0.2 micron, and are negatively charged. Such polymers are high molecular weight and are produced by polymerizing a styrene monomer in the presence of water to form latices.

The polystyrene latex employed in the present process preferably has an average particle size in the range of from 0.15 to 0.25 micron. Such a polystyrene latex suspension is available from Monsanto Chemical Company under the trademarke "Lytron 615" and from Koppers Company, Inc., Pittsburgh, Pa., under the trademark "Dylex K–31."

To prepare a 7-S gamma-G globulin coated polystyrene latex as described in U.S. Pat. 3,088,875, the polymer particles in the dispersed phase of such a starting polystyrene latex and the gamma globulin are combined in an aqueous buffered solution. Normally the pH is above 8.0, preferably 8.2. A preferred buffered solution includes glycine and saline. The patent states that advantageous results are obtained when the latex-gamma glubuin mixture is heated, e.g., at 57° C. for 15 to 30 minutes.

In order to facilitate visualization of the formation of coagulated polystyrene, particles, a dye, e.g., brilliant green, can be incorporated into the latex-gamma globulin diagnostic reagent, e.g., added as a sterile 1% solution in the proportion of 1:500 in the final product. The final step in the preparation of the latex-protein diagnostic reagent is the dilution of the concentrated latex-protein mixture with an appropriate buffer. One volume of latex-protein mixture can be combined with about 4.5 volumes of sterile glycine-saline buffer at pH 8.2 and containing 1% sodium azide. Alternatively, the concentrated latex-protein mixture can be diluted with a buffer prior to the heating step which would then be the final step.

In the final reagent mixture, the latex polymer usually is present in a concentration of about 0.2% to about 0.5% and with the protein reactant is usually present in a concentration of about 0.05% to about 0.1%. Stock preparations can contain the latex polymer in more concentrated amount, for example, the latex polymer can comprise 5% or more by volume of the preparation.

Orgotein

Orgotein and a process for its production is the subject of U.S. patent application Ser. No. 15,883, filed Mar. 2, 1970.

Orgotein is the non-proprietary names adopted by the United States Council for Adopted Names for an isolated, pure, water-soluble, fairly low molecular weight anti-inflammatory protein metal chelate chelated with a divalent metal. (See J.A.M.A., May 26, 1969, vol. 208, No. 8; Huber et al., Abstracts Seventh Annual Meeting of the Society of Toxicology, Washington, D.C., March 1968; Carson et al., Federation Proceedings 29, 420 [978] (1970).

Orgotein defines a family of protein congeners having a characteristic combination of physical, chemical, biological and pharmacodynamic properties. Each of these congeners is characterized physically by being the isolated, substantially pure form of a globular, buffer and water-soluble protein having a highly compact native conformation which, although heat labile, is stable to heating for several minutes at 65° C. when dissolved in a buffer solution containing a salt of a divalent metal having an ionic radius of 0.60 to 1.00 A. and which on gel electrophoresis gives a characteristic multiple-band pattern. Chemically, each is characterized by containing all or all but one of the essential aminoacids, a small percentage of carbohydrate, no lipids, 0.1 to 1.0% metal content provided by one to 5 gram atoms per mole of one or more chelated divalent metals having an ionic radius of 0.60 to 1.00 A., and substantially no chelated monovalent metals or those that are cell poisons in the molecule. Pharmacodynamically, each of the congeners is characterized by being a non-toxic, only weakly immunogenic injectable protein whose pharmacodynamic properties include anti-inflammatory activity which, like its compact conformation, is related to its chelated divalent metal content. Immunological relatedness of an orgotein congener is sufficient to enable its antibodies prepared in the rabbit or other suitable animal to recognize as an antigen one or more other orgotein congeners and/or for one or more of the antibodies to other orgotein congeners to recognize it as an antigen, as evidenced, for instance, in gel immunoelectrophoresis and/or gel immunodiffusion. Although some of the physical and chemical properties and the type and degree of pharmacodynamic efficacy of orgotein vary from congener to congener, all orgotein congeners possess the above combination of properties.

Orgotein is readily soluble (>50 mg./ml.) in water and common aqueous buffers, pH 6.5–10.0. Orgotein's metal ion content and composition are related to its pharmacodynamic activity. Bivalent cations with ionic radii of 0.6–1.0 A. are the most effective. A mixture of Cu, Mg and Zn at a total content of 2–5 gram atoms per mole produces the highest level of physiological activity. The relative amounts of each of the three metals can vary broadly within this total. Most samples also contain trace amounts of Ca, Fe, and Si as the only other metals detectable by emission spectroscopy. All metals can be removed by prolonged dialysis against $10^{-2}$ M EDTA or $10^{-3}$ M orthophenanthroline. At levels below 2 gram atoms per mole, the biological effectiveness is diminished, and below 1 gram atom per mole the protein progressively unfolds, losing biological activity. The metal ions thus appear to play a decisive role in maintaining the molecular conformation essential for biological activity, acting as "locking pins" by producing intra-molecular cross links. Differences in affinity for buffer anions probably explain why, at identical strength, orgotein behaves differently in certain buffers (phosphate, borate) than in others (tris, maleate, EDTA).

The aminoacid composition of the orgotein congeners is remarkably consistent irrespective of the source from which it is isolated according to the process of this invention. The close relatedness of orgotein congeners is apparent from the surprisingly small variances in the aminoacid analyses for a protein isolated from such diverse sources as beef liver and chicken red blood cells, as shown in Table I below.

Table II lists the aminoacid residues of several orgotein congeners as calculated from a molecular weight of 32,500. Table IIa lists other properties of various orgotein TABLE I.—AMINO ACID COMPOSITION OF ORGOTEIN CONGENERS
[Mole percent]

| Aminoacid | Liver/beef | Red blood cells (RBC) | | | | | |
|---|---|---|---|---|---|---|---|
| | | Beef | Sheep | Horse | Rabbit | Chicken | Human |
| Alanine | 6.4 | 6.3 | 6.2 | 5.9 | 6.0 | 7.3 | 7.1 |
| Arginine | 2.9 | 2.6 | 3.2 | 2.0 | 2.8 | 2.6 | 2.6 |
| Aspartic acid | 10.7 | 11.2 | 11.4 | 10.8 | 10.8 | 11.4 | 11.8 |
| Cystine/2 | 2.5 | 2.0 | 1.8 | 2.0 | 1.7 | 3.1 | 2.4 |
| Glutamic acid | 7.8 | 7.7 | 7.2 | 10.0 | 8.0 | 8.3 | 8.8 |
| Glycine | 16.4 | 16.3 | 17.2 | 15.9 | 17.1 | 17.7 | 16.1 |
| Histidine | 4.0 | 5.0 | 4.5 | 6.2 | 5.3 | 5.4 | 4.5 |
| Isoleucine | 5.2 | 5.7 | 5.8 | 4.7 | 4.9 | 4.8 | 5.3 |
| Leucine | 6.0 | 5.4 | 5.5 | 5.9 | 6.9 | 4.7 | 6.4 |
| Lysine | 6.6 | 6.6 | 8.1 | 8.8 | 6.7 | 6.5 | 7.2 |
| Methionine | 1.2 | 0.8 | 0.6 | 1.9 | 0.9 | 1.0 | 0.3 |
| Phenylalanine | 2.8 | 2.5 | 2.2 | 2.9 | 2.8 | 2.6 | 2.5 |
| Proline | 4.0 | 4.1 | 4.8 | 3.7 | 4.2 | 4.1 | 3.7 |
| Serine | 5.4 | 5.3 | 4.7 | 4.8 | 5.7 | 4.6 | 6.0 |
| Threonine | 7.8 | 7.7 | 6.2 | 5.2 | 6.6 | 5.8 | 5.5 |
| Tryptophan [1] | 0.3 | 0.2 | 0.3 | 0.3 | Nil | 0.3 | N.D. |
| Tyrosine | 0.6 | 0.7 | 0.6 | 0.3 | 0.2 | 0.7 | 0.3 |
| Valine | 9.7 | 10.0 | 9.1 | 8.9 | 9.8 | 9.4 | 9.6 |
| Total | 100.3 | 100.1 | 99.4 | 100.2 | 100.4 | 100.3 | 100.1 |

[1] Determined spectrophotometrically according to Edelhoch, H., Biochem., 6, 1948 (1967).

TABLE II.—AMINOACID PROFILE OF ORGOTEIN CONGENERS
[Residues per mole, M.N.=32,500]

| Aminoacid | Bovine Liver | Bovine RBC | Horse RBC | Sheep RBC | Rabbit RBC | Chicken RBC | Human RBC | Range | Average |
|---|---|---|---|---|---|---|---|---|---|
| Lysine | 21.4 | 21.4 | 26.3 | 26.3 | 21.8 | 21.1 | 23.4 | 21–26 | 23.1 |
| Histidine | 13.0 | 16.2 | 18.5 | 14.6 | 17.2 | 17.6 | 14.7 | 13–19 | 16.0 |
| Arginine | 9.5 | 8.4 | 6.5 | 10.4 | 9.1 | 8.4 | 8.4 | 7–10 | 8.7 |
| Aspartic | 34.8 | 36.4 | 34.8 | 37.0 | 35.1 | 37.0 | 38.3 | 35–38 | 36.2 |
| Threonine | 25.3 | 25.0 | 20.1 | 15.9 | 21.4 | 18.8 | 17.9 | 16–25 | 20.6 |
| Serine | 17.5 | 17.2 | 14.0 | 15.3 | 18.5 | 15.0 | 19.5 | 14–20 | 16.7 |
| Glutamic | 25.3 | 25.0 | 35.1 | 23.4 | 26.0 | 27.0 | 28.6 | 23–35 | 27.2 |
| Proline | 13.0 | 13.3 | 14.0 | 15.6 | 13.7 | 13.3 | 12.0 | 12–16 | 13.6 |
| Glycine | 53.2 | 53.0 | 52.3 | 55.9 | 55.7 | 57.5 | 52.3 | 52–58 | 54.3 |
| Alanine | 20.8 | 20.5 | 19.5 | 20.2 | 19.5 | 23.7 | 23.0 | 20–24 | 21.0 |
| Cystine-½ | 8.1 | 6.5 | 5.8 | 5.8 | 5.8 | 10.0 | 7.8 | 6–10 | 7.1 |
| Valine | 31.5 | 32.5 | 31.5 | 29.5 | 31.8 | 30.6 | 31.2 | 30–33 | 31.2 |
| Methionine | 3.9 | 2.6 | 3.9 | 1.9 | 2.6 | 3.2 | 1.0 | 1–4 | 2.7 |
| Isoleucine | 16.9 | 18.5 | 15.6 | 18.8 | 16.0 | 15.6 | 17.2 | 16–19 | 16.9 |
| Leucine | 19.5 | 17.6 | 19.9 | 17.9 | 19.9 | 15.3 | 20.7 | 15–21 | 18.7 |
| Tyrosine [1] | 1.9 | 2.3 | 2.0 | 1.9 | 0.8 | 2.3 | 1.0 | 1–2 | 1.7 |
| Phenylalanine | 9.1 | 8.1 | 10.4 | 7.2 | 9.1 | 8.4 | 8.1 | 7–10 | 8.6 |
| Tryptophan [2] | Nil | Nil | Nil | Nil | Nil | 0.9 | 0.9 | 0–1 | Nil |
| Total | 324.7 | 324.5 | 325.0 | 321.8 | 323.9 | 325.7 | 326.0 | | 324.2 |

[1] Average of aminoacid analysis and spectrophotometric det.
[2] Spectrophotometric det.

TABLE IIa.—PHYSIO-CHEMICAL CONSTANTS OF ORGOTEIN CONGENERS

| | Bovine Liver | Bovine RBC | Horse RBC | Sheep RBC | Rabbit RBC | Chicken RBC |
|---|---|---|---|---|---|---|
| Isoelectric point | 5.08 | 5.10 | 5.85 | 5.7 | 4.6 | 4.9 |
| 1% $A_{280}$, glycine buffer pH 8.5 | 2.3 | 2.2 | 2.3 | 1.9 | 1.9 | 2.8 |
| Lipids | Nil | Nil | Nil | | | |
| Carbohydrates [1] | 0.59 | 0.52 | 0.57 | 0.62 | 0.66 | |
| Immune (Ag/Ab ratios [2]) | 1:400 | 1:400 | 1:16 | 1:200 | 1:1 | 1:1 |
| Metals (GAPM): [3] | | | | | | |
| Copper | 2.14 | 1.77 | 1.88 | 1.84 | 1.83 | 1.78 |
| Magnesium | 0.24 | 0.34 | 0.32 | 0.30 | Nil | 0.22 |
| Zinc | 2.08 | 2.28 | 2.12 | 2.05 | 2.19 | 2.28 |
| Calcium | 0.03 | 0.05 | 0.04 | 0.03 | 0.07 | 0.07 |
| Iron | 0.02 | 0.02 | Nil | 0.02 | 0.07 | 0.04 |
| Manganese | 0.03 | Nil | 0.01 | Nil | Nil | 0.02 |
| Silicon | 0.15 | 0.37 | 0.08 | 0.34 | 0.37 | 0.31 |
| Others | Nil | Nil | Nil | Nil | Nil | Nil |
| Bioassay (Ungar) [4] | 100 | 107 | 102 | 83 | 97 | 96 |
| Superoxide dismutase activity, units/mg | 3,640 | 3,320 | 3,200 | 3,050 | 3,900 | 4,010 |

[1] Modified orcinol procedure, expressed as percent glucose.
[2] Anti-bovine RBC Rabbit DEAE-purified γ-globulin.
[3] Emission spectroscopy.
[4] As percent of reference control standard, bovine liver orgotein.

congeners isolated from a buffer solution containing a mixture of $Mg^{++}$ ($10^{-3}$ M), $Cu^{++}$ ($10^{-4}$ M) and $Zn^{++}$ ($10^{-5}$ M) ions.

As can be seen in Table I, the orgotein congeners are very similar in aminoacid composition. Their similarity can further be shown by calculating the aminoacid Difference Index (D.I.) of the various congeners, which index gives an indication of the degree of structural relationship between any pair of proteins. To determine the D.I. of one protein relative to another, the absolute difference in the aminoacid content for each of the aminoacids present in the proteins is calculated. The sum of these differences multiplied by 50 is the D.I. of the two proteins. Thus, two proteins of identical aminoacid composition would have a D.I. of 0. H. Metzger et al., Nature, 219, 1166 (1968), report the D.I. for 630 protein pairs. All pairs had a D.I. of at least 9 and all except 4 pairs had a D.I. substantially higher than 9. The D.I. of orgotein congeners, e.g., orgotein isolated from beef, sheep, horse, rabbit and chicken red blood cells, compared with orgotein isolated from beef liver, is less than 9 and usually less than 8. The very low D.I. of each of the pairs confirms their extremely close structural similarity.

Orgotein is formed of all or all but one of the essential aminoacids. The aminoacid residue content does not vary greatly from congener to congener. With most congeners a substantial variation (more than 6 residues) in the number of residues of any aminoacid occurs in no more than 3 of the aminoacids.

The apparent molecular weight of beef liver orgotein as determined by gel filtration using Sephadex G-200 is about 33,000±3%. Orgotein isolated from beef red blood cells (RBC) was found to have an apparent molecular weight of about 33,500, a variation well within the limit of error of the method. By gel filtration, the apparent molecular weight of horse RBC orgotein is 32,500; sheep RBC, 32,000; rabbit RBC, 33,000; chicken RBC, 32,000. These values are also within the limits of error for this method. Molecular weights calculated directly by aminoacid analysis indicate most congeners are quite close to beef liver orgotein in molecular weights.

Original molecular weight determinations established the molecular weight of beef liver orgotein at about 32,500. Subsequent studies indicated higher and lower figures but exhaustive studies using sedimentation equilibrium analysis have now established that beef liver orgotein indeed has a molecular weight of about 32,500 (±3%). Molecular weights based on the average of the values obtained by osmometry, sucrose density gradient, sedimentation equilibrium, aminoacid profile and gel filtration on a Sephadex G-200 (Pharmacia Inc.) column 90 x 2.5 cm., eluted with saline and phosphate buffer (pH 7.4) using ribonuclease, chymotrypsin, bovine serum, albumin and gamma globulin as standards also are about 32,500. Based on this molecular weight and about a 0.3% ash content, the best values for the protein chelate are a total of about 324 aminoacid residues and about 2–5 gram atoms of metals per molecule.

In the ultra-centrifuge, orgotein in normal saline moves as a uniform, sharp band, with a sedimentation coefficient (beef liver orgotein) of about 3.32±0.05 Svedberg units.

Beef liver orgotein has an isoelectric point at pH 5.10±0.05, and an isoionic point at 5.35±0.1. The isoelectric point of other orgotein congeners varies somewhat, e.g., from about 4.6 to 5.9. The isoelectric point was determined by isoelectric focussing or by gel electrophoresis at different pH's. The isoionic point was determined according to J. Riddiford et al., Biochem. 239, 1079 (1964). The protein was thoroughly dialyzed to free it completely from all electrolytes and then lyophilized. 25.8 mg. of the lyophilized product were dissolved in 5 ml. deionized water, placed in a cell maintained at 25° C. under a nitrogen atmosphere and allowed to come to a stable pH (about 40 to 60 minutes).

The presence of carbohydrate in the protein product was first detected by disc gel electrophoresis, using the Schiff test (W. F. McGuckin and B. F. McKenzie, Clin. Chem. 4, No. 6, December 1965) on acrylamide and cellulose acetate electropherograms of orgotein. Tests with typical sugar reagents after prior acid hydrolysis, indicate the presence in beef liver orgotein of about 0.5–1% carbohydrate, expressed as commonly is done, in terms of glucose. The carbohydrate appears to be covalently bonded to the protein. The carbohydrate, however, is probably a pentose, methylpentose and/or glucuronic acid rather than a hexose as evidenced by known colorimetric reactions (Z. Dische, Methods in Carbohydrate Chemistry, 1, 486, Academic Press, New York (1962)). Heptoses, 2-deoxypentoses, hexosamines and sialic acid also could not be detected. A typical elemental analysis of beef liver orgotein is C, 46.82; H, 6.41; N, 16.13; S, 1.10; P, nil; Ash <1%.

Gas chromotography and electrophoresis tests establish that orgotein is not a lipoprotein. It contains less than 0.01% lipid phosphorous, less than 0.1% cholesterol, less than 0.05% galactolipid and no detectable water-soluble glycolipids.

The orgotein congeners analyzed to date have numerous titrable ε-amino groups but few titrable —SH and —OH (tyrosyl) groups. For example, beef liver orgotein and beef RBC orgotein contain one titrable OH (tyrosyl) group (N-acetylimidazole titration), one titrable—SH (p-mercuribenzoate) and 15–16 (beef liver) and 16–17 (beef RBC) ε-amino groups (trinitrobenzenesulfonic acid titration).

Orgotein has at pH an infrared spectrum curve typical of proteins.

Beef liver orgotein has a corrected $A_{280}$ (pH 7.0 buffer) of 0.23±0.02 (1 mg./ml.). In Ser. No. 576,454, filed Aug. 31, 1966, now abandoned, the $A_{280}$ ultraviolet absorbance of substantially pure beef liver orgotein was reported as 0.585 (1 mg./ml.). This high absorbance was attributed to the tyrosine and tryptophane content of orgotein. Subsequent analytical studies have established that beef liver orgotein has only 2 tyrosine and no tryptophan, which are too few to account for this high absorbance at $A_{280}$.

In the applications of W. Huber, Ser. No. 3,492, now U.S. 3,624,251 and Ser. No. 3,538, now abandoned, both filed Jan. 16, 1970, and entitled "Orgotein Purification Process," there are described processes for removing traces of a tenacious extraneous protein in the samples of orgotein produced according to the process of Ser. No. 576,454. It was found that samples of bovine liver orgotein which are free of this extraneous protein have a substantially lower $A_{280}$, i.e., <0.3. Thus, the high $A_{280}$ absorbance of the orgotein produced according to the process of Ser. No. 576,454 is due to the presence of this tenacious extraneous protein, which is rich in tyrosine and tryptophane residues.

In the visible spectrum, samples of orgotein which contain $Cu^{++}$ in the molecule exhibit a broad peak at 655 mμ, which peak confirms the presence of chelated copper in the molecule.

In gel-electrophoresis, e.g., on polyacrylamide and argarose, orgotein gives a typical pattern showing multiple closely spaced bands at various pH's and at low ionic strength. This multi-band electropherogram pattern is characteristic of orgotein and its congeners but the location of the bands relative to the origin can vary from congener to congener. A typical electropherogram pattern obtained for orgotein from beef liver in thin film, argarose gel is given in the table below. All values are approximate.

Conditions of electrophoresis

Argarose gel—Analytical Chemists, Inc.
Buffer—0.02 M tris; 0.15 glycine; $1.2 \times 10^{-4}$ M EDTA; 0.08% thymol—pH 8.45; conductivity 280 μʊ (mhos)
Power conditions—3.5 ma. 300→370 v.

|  | Approximate band width, mm. | Approximate distance from origin, mm.[1] | Relative intensity |
|---|---|---|---|
| Band 1 [2] | 3.0 | 2.8 | 45.1 |
| Band 2 | 3.2 | 9.5 | 38.2 |
| Band 3 | 2.5 | 15.8 | 16.6 |

[1] Center of origin through to center of band.
[2] Closest to origin (most cathodic).

From recent literature data, it is now apparent that this family of metalloproteins is the same as the proteins previously isolated in various states of purity and given the names hemocuprein and hepatocuprein, Mann and Keilin, Proc. Royal. Soc. for Biol. Sci., 126, 303 (1939); cerebrocuprein, Porter and Ainsworth, J. Neurochem., 1, 260 (1957); erythrocuprein, Markowitz et al., J. Biol. Chem., 234, 40 (1959); and cytocuprein, Carrico and Deutsch, J. Biol. Chem., 244, 6087 (1969). For other references, see Mohamed and Greenberg, J. Gen. Physiol. 37, 433 (1954); Porter and Folch, Arch. Neurol. Psychiat. 77, 8 (1957); Porter and Ainsworth, J. Neurochem., 5, 91-(1959); Krimmel et al., J. Biol. Chem., 234, 46 (1959); Wyman, Biochem. Biophys. Acta, 45, 387 (1960); Shields et al., J. Clin. Inv., 40, 2007 (1961); Markowitz et al., Anal. Chem., 33, 1594 (1961); Porter et al., Arch. Biochem. Bioph., 105, 319 (1964); Stansell and Deutsch, J. Biol. Chem., 240, 4299 (1965); ibid, 240, 4306 (1965); Stansell and Deutsch, Clin. Chem. Acta, 14, 598 (1966); McCord and Fridovich, J. Biol. Chem., 21, 5753 (1968); Hartz and Deutsch, J. Biol. Chem., 244, 4565 (1969); McCord and Fridovich, J. Biol. Chem., 21, 6056 (1968); Carrico and Deutsch, ibid., 245, 723 (1970). These metallo proteins have been reported to possess very high superoxide dismutase activity. See McCord and Fridovich, J. Biol. Chem., 244, 6049 (1969); Keele, McCord and Fridovich, J. Biol. Chem., 245, 6176 (1970); ibid., 246, 2875 (1971).

Orgotein can be isolated from red blood cells according to the method of U.S. 3,579,495. It can be isolated from liver and other tissues of a variety of animals, preferably bovine, according to the process of U.S. application Ser. No. 15,883, filed Mar. 2, 1970; Netherlands Pat. 66/14,177; Belgium Pat. 687,828; and British Pat. 1,160,151.

SUMMARY OF THE INVENTION

This invention relates to a method for rendering a polystyrene latex RF coagulable by coating the latex with orgotein; to a method for assaying orgotein samples for purity and/or biological activity by determining the potentiating effect of the sample on the RF coagulability of a polystyrene latex; to a method of rendering a polystyrene latex RF detecting system more quantitative by coating the latex with orgotein, thereby rendering the latex more sensitive to RF concentration; to a method for rendering a polystyrene latex which is RF coagulable when coated with 7-S gamma-G globulin coagulable in the absence of such globulin, by coating the latex instead with orgotein; and to a method for reducing the cost of polystyrene latex RF detecting system by reducing the amount of RF containing serum required for the positive control and/or the necessity of coating the latex with globulin by coating the latex with orgotein.

In one of its tangible embodiments, the invention resides in a polystyrene latex coated with orgotein. In another, it resides in a RF detecting polystyrene latex test kit comprising RF containing serum as positive control and a polystyrene latex coated with orgotein as the RF detecting system.

In the description herein of the interaction of orgotein and latex, the term "coated" is used to conform with the prior art description of the product of the gamma globulin-latex interaction. However, it is to be understood the term is not intended to describe the physical state of the orgoein-latex interaction product.

Orgotein is a powerful potentiator of the rheumatoid factor (RF) latex agglutination test. This potentiating effect is specific. Orgotein does not have any appreciable effect on C-reactive protein; streptolysin O-antistreptolysin; staphylolysin-antistaphylolysi· test systems. This specificity appears unique since no other pure protein tested in the same system exhibited a similar effect. This specificity has permitted the use of the modified RF latex agglutination test (a) as a reliable quality control method for assaying the biological activity of samples of orgotein; (b) for reducing the amount of rheumatoid factor-containing serum required as positive control in the RF-latex agglutination test; (c) using naked latex reacted only with orgotein; (d) rendering the RF-latex agglutination test more sensitive and/or more quantitative in nature; and (e) for detecting the presence of orgotein in protein mixtures.

It is therefore an object of this invention to provide a method for assaying the biological activity of samples of orgotein. Another object is the provision of a novel combination for performing the RF-latex agglutination test and a method for the production and use thereof. Still another object is the provision of a method for detecting orgotein in protein mixtures. Other object will be apparent to those skilled in the art to which this invention pertains.

DETAILED DISCUSSION

Materials used

RF-latex agglutination: This test is routinely performed as one of the criteria for the diagnosis of rheumatoid arthritis. It is semiquantitative in nature and can be performed on a ruled slide, side-by-side with a control. The test is based on the ability of the rheumatoid factor, a 19-S gamma-M protein, to couple with normal 7-S gamma-G globulin, thus forming a 22-S adduct, which can be demonstrated in the ultracentrifuge. For the test, 7-S gamma-G globulin is coated on a polystyrene latex (0.15–0.25μ) which will then agglutinate when mixed with serum containing rheumatoid factor. In practice, positive and negative controls are run to facilitate the interpretation of the results. Latex reagent, control sera and diluent buffer are commercially available as kits (Hyland Laboratories, Los Angeles, Calif.; Hoechst Pharmaceuticals, Inc., Division of American Hoechst, Inc., Cincinnati, Ohio). The experiments described herein were carried out primarily with the Hyland kits.

The test sets appear to lose activity after about two months, even if stored at 4° C. For critical determinations, therefore, an orgotein sample of known activity was run side-by-side with the unknown.

Orgotein: Lots were used whose anti-inflammatory potency by the Ungar bioassay, their electropherogram and their spectroscopic analysis indicated high purity, uniformity and pharmacodynamic efficacy, except the lots used to demonstrate the usefulness of RF latex agglutination as a quality control test for orgotein listed and characterized in Table VI.

All chemicals used in the preparation of buffers and solutions were of reagent grade. Deionized water of a conductivity of about 20 microohm's was used throughout.

Other proteins: Uniformity in each instance was checked by thin gel agarose electrophoresis. Electrophoretic runs were in 0.025 M tris-glycine buffer, pH 8.45 and lasted 30 minutes. In cases of unusually great mobility, running times were reduced to 20 minutes. All runs were at constant current, i.e., ~5 ma.; voltages were adjusted to 185–

195 v. at the start; at the end of the run the voltage was no more than 20 v. higher. The plates used (Analytical Chemists, Incorporated, Palo Alto, Calif.) have eight application wells located at a slight offset from the midle of the plate. This permits running multiple samples simultaneously and observing anodic as well as cathodic migration patterns at the same time and on the same plate.

Metal contents were determined by emission spectroscopy using a 1.5 meter grating spectrograph with a resolution of 7 A. per mm.

Even the most highly purified commercially available protein samples often exhibited considerable inhomogeneity and extraneous metal impurities. Hence, these products were purified whenever possible prior to use by gel-filtration over Sephadex G–100 and/or by dialysis against o-phenanthroline until impurities had been reduced to less than 10%. Samples with total extraneous metal impurities of no more than 0.1 gram-atoms per mole were considered satisfactory. To achieve this, extensive and repeated dialysis (4° C.) against o-phenanthroline was frequently necessary. Tubing, equipment, chemicals and solvents used in the o-phenanthroline dialysis steps and the subsequent lyophilization had been previously rigidly freed from metal contamination, and proven to be so by spectroscopic analysis and washes with dithizone (Hughes and Klotz, Meth. Biochem. Anal. 3, 281, 1962).

Bare latex.—In certain examples described hereinafter, an uncoated polystyrene latex (Hytex, Hyland Laboratories, Cat. No. 70–015) was used. It is an aqueous suspension, pH 7.8 of polystyrene particles 0.15 to 0.25 micron in diameter. The bare latex is identical to the material used in the preparation of the Hyland latex-globulin reagent, except it is not coated with 7–S human gamma-G globulin. The material contained 174,000 particles per ml. The globulin-latex reagent of the Hyland RF test kit contained 168,000 particles per ml. Experiments with either latex were, therefore, comparable as to particle concentration. The use of bare latex permitted evaluation of the dependency of the effects of orgotein in the RF test upon the presence of a 7–S human gamma-G globulin coat on the latex and whether orgotein itself would coat onto the polystyrene latex.

Procedures used

Orgotein-latex mixture.—The novel products of this invention are RF coagulable reaction products of orgotein and uncoated or 7–S gamma-G globulin coated polystyrene latex having a particle size of less than one micron. When the latex is a coated latex as described in U.S. 3,088,875, the latex is already RF coagulable in the absence of the orgotein. The novel reaction product of that latex and orgotein is characterized by increased sensitivity and other properties as defined herein. When the latex is an uncoated latex, it is not RF coagulable in the absence of the orgotein.

The amount of orgotein which is reacted with the coated latex can vary widely since even small amounts of orgotein will increase the RF sensitivity of the latex. Generally, amounts of orgotein of up to about ten or more times by weight of the starting latex solids are employed. Greater than about a 10:1 proportion of orgotein to latex solids does not significantly further increase the RF sensitivity of the gamma globulin coated latex.

Since uncoated, i.e., bare, polystyrene latex is not RF sensitive, an amount of orgotein sufficient to render the bare latex RF coagulable is employed. Generally, at least about one part, preferably about 2 to 10 parts, by weight of the orgotein per part by weight of latex solids are employed.

The concentration of the polymer solids in the orgotein-latex reaction product usually is less than about 5%, e.g., 0.1–1.0%, preferably about 0.2 to about 0.5%.

100 mgs. of orgotein are dissolved in 5 ml. of saline-glycine buffer, pH 8.2 (22.5 g. glycine, 30.0 g. NaCl, 3.0 g. sodium azide, 9.4 ml. 1 N NaOH in 3 liters deionized water). If necessary, traces of insolubles are removed by filtration through a millipore filter ($0.45\mu$). Equal volumes of the filtrate and the latex-globulin reagent of the Hyland kit are thoroughly mixed in a small test tube with a thin glass rod and the mixture is incubated for 10 minutes at room temperature. Longer incubation times and/or higher incubation temperatures were found not to change the results.

When using bare latex, orgotein was dissolved in saline-glycine buffer pH 8.2, its concentration in the final test mixture being 5 mg./ml. Incubation of orgotein in saline-glycine buffer was carried out at room temperature and at 37° C. for 30 minutes. The positive control serum of the Hyland kit was used as source of the rheumatoid factor. All other conditions were as described herein.

The test tube containing the uncoated or gamma globulin coated latex-orgotein mixture is kept for an additional 20 minutes at room temperature and then checked for agglutination of the latex particles. If this is the case, the test results are discarded. This check was established after it was observed that certain pure proteins other than orgotein and certain synthetic anti-inflammatories caused flocculation of the latex per se.

The literature indicates the latex reagent can agglutinate spontaneously if kept for extended periods at room temperature. For instance, the orgotein (10 mg./ml.) latex reagent mixtures showed no agglutination when kept at room temperature for three hours but when left overnight (18 hours), there was a heavy agglutination of the latex particles. To guard against false positives the technique was adopted to observe the remainder of the latex reagent containing orgotein for at least another 20 minutes at room temperature after completion of the test. Only in the complete absence of spontaneous agglutination were the test results considered valid.

In all instances where other proteins or other compounds were used instead of orgotein, the product was dissolved in saline-glycine buffer, pH 8.2 at the appropriate concentration, filtered through millipore and then mixed with the latex reagent for room temperature incubation.

In some instances orgotein was tested in the presence of other pure proteins, to check for potentiation or inhibition. In these cases, the proteins were added at the appropriate concentration (1–10 mg./ml.) to the orgotein solution in saline-glycine buffer and incubated together at room temperature. All other operations were carried out as described above for orgotein.

The technique of dissolving orgotein or any other protein tested in buffer rather than directly in the latex reagent was adopted when it became apparent that the presence of insoluble impurities could falsify the test results far beyond the error due to the slightly lower solute concentration which per se would exercise at most a minor effect. However, the presence of insoluble, extraneous denatured protein can and wil selectively depress the end-point of the orgotein potentiation.

The inhibition caused by the presence of 20% heat-denatured orgotein is very striking and reduces the potentiation to somewhere between $\frac{1}{16}$ and $\frac{1}{40}$ of that of the filtered material. With pure orgotein, insoluble impurities, e.g., those due to slight denaturation during lyophilization, lower the positive control end-point by no more than one dilution if present at less than 5%. In such cases the orgotein buffer solution can be incubated with the latex reagent without filtration for all routine testing and quality control work. In all other instances, the buffer solutions were checked carefully for clarity and filtered through millipore where needed.

Positive control.—The positive control of the kit, containing standardized human serum with rheumatoid factor, is diluted with the above saline-glycine buffer to give dilutions of 1:25, 1:50, 1:100, 1:150, 1:250 and higher, if desired. Other dilutions, both intermediate and broader, were also investigated but the above range was selected as most representative for producing reliable and reproducible end-points.

Table I is representative data showing the dilutability of the positive control of RF latex test kits of American Hoechst, Inc. and of Hyland Laboratories, Inc., which according to U.S. 3,088,875 is RF containing human serum diluted 20 times with glycine-saline buffer. The data also show that pre-incubation (30 minutes at 37° C.) of either the latex reagent or the positive control does not affect the coagulation times obtained.

TABLE IV

Agglutination times (sec.) of positive control and latex reagent after room temperature incubation of latex reagent orgotein buffer solution mixtures for various times (min.)

| Dilution of positive control | 0 min. incubation | 10 min. incubation | 30 min. incubation | 90 min. incubation |
|---|---|---|---|---|
| 1:10 | 15 | 15 | 15 | 15 |
| 1:20 | 15 | 15 | 15 | 15 |
| 1:40 | 15 | 15 | 15 | 15 |
| 1:60 | 15 | 15 | 15 | 15 |
| 1:80 | 15 | 30 | 15 | 15 |
| 1:100 | 30 | 30 | 30 | 30 |
| 1:150 | 45 | 45 | 45 | 45 |

TABLE III

| | Latex reagent and positive control American Hoechst, Inc. | | | |
|---|---|---|---|---|
| Dilution of positive control | American Hoechst | Hyland Labs | Latex reagent positive control (incub.) | Latex reagent (incub.) positive control |
| 0 | +++ 45 sec | +++ 30 sec | +++ 45 sec | +++ 45 sec |
| 1:2 | +++ 45 sec | +++ 30 sec | N.D.[1] | N.D.[1] |
| 1:4 | ++ 120 sec | +++ 45 sec | N.D.[1] | N.D.[1] |
| 1:8 | +‒ 120 sec | +‒ 60 sec | +‒ 120 sec | +‒ 120 sec |
| 1:16 | Neg 180 sec | Neg 180 sec | Neg 180 sec | Neg 180 sec |

[1] N.D.=Not determined.

The Hyland test kits generally gave slightly higher readings than those of American Hoechst at the lower dilutions. However, the end-points were identical for both kits. The Hyland materials also gave somewhat more pronounced clumping. This behavior and the presence of an indicator dye made the end-point more readily visible. The RF latex agglutination is called positive only when visible flocculation is observed within 1-2 minutes, since longer time periods may cause nonspecific agglutination. To avoid ambiguities, flocculation within 45 seconds was selected as the indicator for a positive test. The highest dilution of the positive control where this flocculation occurred between 45 and 60 seconds was called the end-point.

Table III shows that a 1:2 dilution of the positive control does not influence the character or the time span in which flocculation occurs. Hence, the orgotein and other products tested were dissolved in saline-glycine buffer, pH 8.2 rather than directly in the latex reagent. This permitted a check for completeness of solution of the test material and filtration of the solutions where necessary.

Agglutination end-point.—The test is carried out by applying 0.05 ml. each (calibrated droppers were used) of the orgotein-latex mixture and of the positive control to one quadrant of a ruled slide, followed by rapid and thorough mixing with a thin, fire-polished glass rod. The mixing operation consumes about 10 seconds. The orgotein concentration in this mixture thus becomes 5 mg./ml. After mixing, the slide is tilted from side-to-side and the mixture observed for macroscopic agglutination at 15 second intervals for a total of up to 120 seconds. A blank is run side-by-side in another quadrant of the slide. The lowest dilution which produces agglutination after 45-60 seconds is taken as the end-point. Tests with the end-point dilution and the next lower dilution are then repeated to confirm the initial observations.

Time and temperature of incubation.—The influence of time and temperature on various phases of the test, when carried out in the presence of orgotein was evaluated. To simulate physiological environment, incubation at 37° C. for 30 minutes was selected. It soon became apparent the orgotein-latex reagent interaction proceeded just as smoothly at room temperature and in fact appeared to be complete within a very short time after mixing. Various incubation times at room temperature were then explored in more detail. Representative data are shown in Table IV.

It is apparent from the data in Table IV that the reaction between orgotein and latex reagent takes place very quickly. Therefore, incubation for ten minutes at room temperature was adopted as the standard for all RF tests.

The pronounced potentiating effect observed when orgotein was incubated with the latex reagent raised the question whether similar effects would occur on incubation of orgotein with the positive control.

Interaction of orgotein with the positive control was tested as follows: A millipore filtered buffer solution of orgotein (20 mg./ml.) pH 8.2 was mixed with an equal volume of positive control and incubated. Another 0.2 ml. aliquot of the orgotein solution was incubated with an equal volume of a 1:20 dilution of the positive control in saline-glycine buffer, pH 8.2. All individual solutions and the resulting 1:2 and 1:40 dilutions of positive control in saline-glycine buffer, pH 8.2 were also incubated. All incubations were carried out at 37° C. for 30 minutes.

Using this technique, the concentration of positive control in the final mixtures was thus 1:2 and 1:40, respectively; that of orgotein was 10 mg./ml. in either dilution. The mixtures with orgotein as well as the controls were tested with latex reagent in the usual manner. The results are presented in Table V.

TABLE V

| Incubated solution plus latex reagent: | Agglutination time, sec. |
|---|---|
| 1:2 dilution with orgotein | 30. |
| 1:2 dilution without orgotein | 45. |
| 1:40 dilution with orgotein | Neg. (180). |
| 1:40 dilution without orgotein | Do. |

The data in Table V establish that orgotein does not potentiate the RF latex agglutination test to any extent if it is preincubated with the positive control rather than with the latex reagent. This could be due to binding of orgotein to the RF factor or another component of the positive control serum, thus removing it from participation in the subsequent precipitin reaction; or binding of orgotein to the latex, either directly or via the 7-S gamma-G globulin coated thereon, is a prerequisite to potentiation of the agglutination effect and such binding sites are unavailable to orgotein once positive control is present in the mixture. The results indicate that a combination of factors may be responsible for the lack of potentiation when orgotein is incubated with the positive control.

Use of orgotein to render latex RF sensitive.—A most surprising aspect of this invention is the fact that orgotein can be used instead of 7–S gamma-G globulin to render polystyrene latex RF coagulable. Even more surprising is the fact it is substantially more efficient than the gamma globulin for this purpose. As shown in Table III, the positive control (RF factor) can be diluted no more than about eight times and still be detected by gamma globulin-coated latex. With properly incubated orgotein-coated latex, dilutions of the positive control of up to 100 times is possible. This is an important fact because of the cost and limited supply of RF-containing serum which is required as the positive control in RF detection kits.

Stabilizer.—As disclosed in the application of W. Huber, Ser. No. 34,006, filed May 4, 1970, now U.S. 3,637,640, sucrose and other saccharides can be used to protect orgotein against denaturation. This protection is operative whether orgotein is dry, e.g., a lyophilized powder, or in solution. These stabilizers permit the lyophilization of orgotein and its exposure to ambient temperatures over extended periods of time, e.g., during shipment or storage without decomposition. Such stabilizers are used during its manufacture. It has been found that the presence of such stabilizers does not alter the orgotein potentiation of the RF latex agglutination test.

Effect of orgotein in C-reactive protein (CRP)-latex agglutination test.—Tillet and Francis (J. Exp. Med. 52, 561, 1962) describe a protein (probably a 7–S gamma-G globulin) which appears in serum during the acute phase of many inflammatory processes, and which in the presence of $Ca^{++}$ combines with the somatic C-polysaccharide of pneumococci. The presently used diagnostic test utilizes a polystyrene latex coated with anti-CRP antibodies prepared from hyperimmune sera. The test is positive for the inflammatory or necrotic phase of a rather wide spectrum of diseases, the majority of which are bacterial or viral in origin. The CRP test is negative where the RF test is positive, i.e., in chronic rheumatoid arthritis and in scleroderma. The CRP test is much less specific and serologically perhaps more closely related to the anti-streptolysin and anti-staphylolysin tests than to the RF test (lit. ref. see Kabat, Exp. Immunochem, 2nd ed., 373, 1964, Thomas).

Because of the inflammatory and latex agglutination aspects of the CRP test, the effect of orgotein in this system was determined. The experimental approach was the same as with the RF test system, i.e., orgotein was incubated at 10 mg./ml. both with the latex reagent and the positive control. In contrast to the RF agglutination test, orgotein is devoid of any significant effect in the CRP test system. It is also ineffective in the anti-streptolysin and anti-staphylolysin tests.

Preparation 1.—Gamma globulin coated polystyrene latex

RF coagulable, 7–S gamma-G globulin coated, polystyrene latex is commercially available from Hyland Laboratories, Los Angeles, Calif. and from Hoechst Pharmaceuticals, Inc., Cincinnati, Ohio. It can be prepared in the manner disclosed in U.S. 3,088,875, as follows:

A polystyrene latex suspension (Lytron 615, available from Monsanto Chemical Company), is employed in sterile form. The latex polymer is transferred aseptically to bottles of distilled water to make a 1:10 stock suspension.

Human gamma globulin (Cohn Fraction II) is dissolved in a glycine-saline buffer at pH 8.2 and containing 0.1% sodium azide to make a 1% solution which is sterilized by filtration through a bacteria-excluding filter. Equal volumes of the 1% Cohn Fraction II solution and the 1:10 stock latex suspension are mixed with sterile precautions, and this latex-globulin mixture is heated at 57° C. for fifteen minutes. The preparation is then stained with brilliant green which is added as a sterile 1% solution in the proportion of 1:90. The concentrated latex-globulin mixture is then diluted with 4.5 volumes of sterile glycine-saline buffer at pH 8.2 and containing 0.1% sodium azide.

The reagent is ordinarily used in conjunction with a 1:20 dilution of the serum under test in a glycine-saline buffer diluent. This dilution reduces the chances of false positive reaction which may occur as the result of the interaction of certain components of non-rheumatoid serums with the latex-globulin reagent at higher serum concentrations.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

Example 1.—Use of RF test as orgotein assay

Table VI shows the correlation of the dilutability of the positive control of the RF test when the latex is mixed with equal parts of a 5 mg./ml. solution of orgotein in buffer solution. The results for the RF latex agglutinuation test shown therein were obtained under the test conditions described above. A fully acceptable orgotein lot gives a 45 sec. agglutination end-point at a dilution greater than 1:150 but usually less than 1:250. The data for the Ungar anti-inflammatory bioassay listed in Table IV is typical of the spread inherent in all anti-inflammatory bioassays. Nevertheless, its correlation with the RF test data is close and consistent. Lots of orgotein of acceptable purity and activity generally give 15–30% at 0.4 mg./kg., 35–55% at 1.0 mg./kg. and 0–65% at 2.5 mg./kg. reduction in inflammation in this test.

The RF test data compare reasonably well with the appearance of the patterns in the respective electropherograms, in the sense that when the RF test is off the electropherogram shows unusual patterns. The test is thus particularly useful for early recognition of lots that are below par in their pharmacodynamic efficacy. Lots 5.4 and 1.3 are examples for this. In the 1.3 lot, the electropherogram was also unusual in that the staining intensity of the second and third band was conspicuously weaker than usual while the first band stained very strongly. The electropherogram of the 5.4 lot, while slightly weak in its overall staining intensity in no way equalled the low activity in the Ungar assay which, however, was readily predictable by the RF test results. Even a borderline case lot (1.10), where at a 1:150 dilution agglutination takes 90 instead of 45 seconds, is a useful indicator for a bioassay performance slightly below average. The electropherogram in this instance was normal. Based on results to date, it appears that readings at 1:100 and 1:150 dilution should be taken as normal when within ±15 seconds of the standard. The end-point of the 3.13 lot is at an unusually high dilution. While this lot also shows excellent activity in the Ungar assay, the RF readings could be slightly exaggerated due to additional potentiation caused by the elevated concentration in this lot of the biologically inert, slow-moving compound. This extra potentiation is probably somewhat akin to the protein effects described hereinafter.

TABLE VI

| | Orgotein lot— | | | | | | | | | | | |
|---|---|---|---|---|---|---|---|---|---|---|---|---|
| | 1.17 | 4.4 | 5.4 | 6.8 | 6.21 | 9.15 | 9.21 | 10.24 | 11.28 | 1.3 | 1.10 | 3.1 |
| Agglutination time (seconds) of 1:1 mixture of latex reagent and positive control orgotein concentration 5 mg./ml. in final test mixture | | | | | | | | | | | | |
| RF-test positive control dilution: | | | | | | | | | | | | |
| 1:25 | 15 | 15 | 45 | 15 | 15 | 15 | 15 | 15 | 15 | 15 | 15 | 15 |
| 1:50 | 15 | 15 | 60 | 30 | 15 | 15 | 15 | 15 | 15 | 30 | 30 | 15 |
| 1:100 | 30 | 15 | 90 | 45 | 45 | 30 | 30 | 30 | 30 | 45 | 45 | 30 |
| 1:150 | | 45 | | | 60 | 60 | 45 | 45 | 45 | 120 | 90 | 30 |
| 1:250 | | 120 | | | 120 | 120 | | 120 | 120 | | 120 | 60 |
| Percent reduction of inflammation versus control | | | | | | | | | | | | |
| Bioassay (Ungar)—Dose: | | | | | | | | | | | | |
| 0.4 mg./kg | 29 | 48 | 0, 0 | 29 | 22 | 0, 7, 10 | 14, 20 | 7–32 | 14, 22 | 7 | 10, 12, 14 | 0, 8, 8 |
| 1.0 mg./kg | 41 | 43, 60 | 5, 12 | 38 | 36 | | 19, 30 | 56–69 | 33, 41 | | | |
| 2.5 mg./kg | 44 | | | | 34 | 63, 41 | 64 | | | 29, 30 | 31, 34, 36 | 51, 62, 66 |
| Indicated purity by electropherogram | | | | | | | | | | | | |
| Electropherogram: | | | | | | | | | | | | |
| Orgotein pattern | (1) | (1) | (2) | (2) | (2) | (3) | (1) | (1) | (1) | (4) | (1) | (1) |
| Slow-moving compound | (5) | 1.0 | 1.0 | (5) | 1.2 | 0.3 | 1.0 | 0.5 | 0.7 | 0.3 | (5) | 2.0 |

1 Normal.
2 Slightly weaker.
3 Very slightly weaker.
4 Weak 2–3 band.
5 Trace.

Example 2.—Dilutability of RF positive control in presence of orgotein

Dilutability of the positive control before coagulation time of the globulin coated latex exceeds 45 secs. is between 1:2 and 1:4. The very pronounced potentiation of the latex agglutination test in the presence of orgotein is illustrated in Table VII. The data also show the dependence of agglutination and agglutination times on the concentration of orgotein. 0.25 mg./ml. is the maximum concentration of orgotein required to obtain agglutination within 45 seconds at a 1:25 dilution of the positive control. Thus, the presence of only 0.25 mg./ml. orgotein increases the dilutability of the positive control at 6–12 times. This means only one sixth the amount of RF containing serum need be provided in the test kits to achieve the same test sensitivity, even with this small amount of orgotein.

Even more striking is the increase in dilutability which can be achieved with higher concentrations of orgotein. At 16 mg./ml. concentration, dilutability of the positive control is increased 40 to 125 times.

In these experiments, incubation time for the latex and orgotein was 10 minutes at room temperature. As in most others, the original solution of orgotein in buffer was twice the listed concentration. A 1:1 (v./v.) mixture of buffer solution and latex globulin reagent was then made and incubated. After incubation, equal amounts (v./v.) of this mixture and the appropriate dilution of the positive control were combined for the actual test. This same technique was used for all other experiments, and arbitrarily selected a nominal concentration of 10 mg./ml. in the buffer-latex (v./v.) mixture as experimentally convenient for clear cut and reproducible results. This concentration of 10 mg./ml. in the latex reagent buffer solution mixture is thus equivalent to 5 mg./ml. in the final test mixture.

Example 3.—Dilutability of RF positive control in presence of mixture of orgotein and other proteins Although it was possible the potentiating effect of orgotein in the RF latex agglutination test might be no more than a non-specific protein effect, experiments with other proteins showed this was unlikely. A systematic study with other proteins was restricted by the fact that the availability of truly pure and uniform proteins is severely limited and a purity equal to orgotein was an absolute prerequisite. Therefore, proteins that appeared insufficiently homogeneous by thin gel agarose electrophoresis or by spectroscopic analysis were re-purified, usually by gel-filtration or dialysis against o-phenanthroline as outlined above. An endeavor was made to cover a broad range of molecular weights, composition and conformation and thereby look at proteins with widely different properties. Table VIII is a compilation of the proteins used, together with their molecular weights and their behavior upon incubation with latex latex reagent at 37° C. for 30 minutes. Incubation at room temperature for 10 minutes, with re-observation after 30 minutes yielded identical results.

TABLE VIII

| Protein | Species | M.W. | Incubation [1] |
|---|---|---|---|
| Albumin, serum | Bovine | 70,000 | No change. |
| Carbonic anhydrase-B | do | 30,000 | Agglutination. |
| Carboxypeptidase-B | do | 34,000 | No change. |
| Catalase | do | 225,000 | Agglutination.[2] |
| Collagenase | Cl. hystol. | 109,000 | Do.[3] |
| Deoxyribonuclease-I | Bovine | 31,000 | No change. |
| Fibrinogen | do | 330,000 | Agglutination. |
| Lysozyme | Egg white | 15,000 | Do. |
| Myokinase | Rabbit | 21,000 | Do. |
| Myoglobin | Sperm whale | 17,900 | No change. |
| Pepsinogen | Bovine | 41,000 | Do. |
| Phosphorylase | Rabbit | 495,000 | Agglutination.[2] |
| Ribonuclease | Bovine | 13,700 | No change. |
| Trypsin | do | 23,250 | Agglutination. |
| Trysinogen | do | 23,950 | No change. |
| Trypsin inhibitor | Soy bean | 21,500 | Do. |

[1] At 37° C. for 30 min. of mixture (v./v.) of protein-buffer sol. (20 mg./ml.) and latex reagent.
[2] Partially insoluble.
[3] Slightly insoluble.

TABLE VII.—COAGULATION TIMES

| Orgotein conc. in latex globulin reagent | Positive control dilution | | | | |
|---|---|---|---|---|---|
| | 1:25 | 1:50 | 1:100 | 1:150 | 1:250 |
| 16 mg./ml | + 15 sec | + 15 sec | + 15 sec | + 30 sec | + 45 sec. |
| 12 mg./ml | + 15 sec | + 15 sec | + 30 sec | + 30 sec | + 60 sec. |
| 10 mg./ml | + 15 sec | + 15 sec | + 30 sec | + 45 sec | Neg. |
| 8 mg./ml | + 15 sec | + 15 sec | + 30 sec | + 45 sec | Neg. |
| 4 mg./ml | + 15 sec | + 30 sec | + 30 sec | + 45 sec | Neg. |
| 2 mg./ml | + 15 sec | + 30 sec | + 45 sec | Neg. | Neg. |
| 0.25 mg./ml | + 45 sec | Neg. | Neg. | | |

The latex agglutination observed with catalyse, collagenase, fibrinogen and phosphorylase may have been due to mechanical overloading because of the size of the molecular volume rather than the specific interaction with the latex surface by an active site or sites in the three enzymes. The reverse is probably true for carbonic anhydrase, lysozyme, myokinase and trypsin. Here, attachment to the surface by specific sites of action may well induce dipole and/or dispersion forces that could bring about pronounced changes in charge distribution patterns and with it collapse of the latex suspension. In this respect, it is of interest that the zymogens, pepsinogen and trypsinogen, caused no change.

As many of the proteins as possible were selected from bovine sources to minimize effects due to species differences. However, experiments with some of the same proteins from other species produced identical results. Thus, the species origin of the proteins is probably of no significant importance on the outcome of their interaction with the latex reagent.

The eight proteins, ranging in MW from 13,700 to 70,000, which caused no change in the latex reagent upon incubation, were then mixed and evaluated with positive control (v./v.) as usual. A representative orgotein lot was run in parallel for comparison. The test conditions thus were identical with the ones used for orgotein. Concentration of proteins in the buffer-latex reagent mixture was 10 mg./ml., equivalent to a molarity range of $7.3 \times 10^{-4}$ to $1.43 \times 10^{-4}$, orgotein at 10 mg./ml. being $3.1 \times 10^{-4}$ M. Representative results are summarized in Table IX.

gotein solution caused agglutination of the latex during incubation even at the lowest concentration (2 mg./ml.). At 10 mg./ml. all others except myoglobin caused latex agglutination during incubation. Bovine serum albumin, deoxyribonuclease, myoglobin and trypsinogen at the higher concentrations were found to exert a certain potentiation of the orgotein effect which, however, did not exceed 1–2 dilutions. Representative results are summarized in Table X.

TABLE X

| Orgotein in saline-glycine buffer, pH 8.2, (20 mg./ml.)—Latex reagent mixed (v./v.) with other protein, incubated 30 min. at 37° C. | Dilution of positive control | | | |
|---|---|---|---|---|
| | 1:50 | 1:100 | 1:150 | 1:250 |
| Albumin, bovine, 5 mg./ml | Pos. 15 sec. | Pos. 15 sec. | Pos. 15 sec. | Pos. 30 sec. |
| Albumin, bovine, 2 mg./ml | Pos. 15 sec. | Pos. 15 sec. | Pos. 30 sec. | Pos. 45 sec. |
| Deoxyribonuclease, 5 mg./ml | Pos. 15 sec. | Pos. 15 sec. | Pos. 15 sec. | Pos. 30 sec. |
| Deoxyribonuclease, 2 mg./ml | Pos. 15 sec. | Pos. 15 sec. | Pos. 30 sec. | Pos. 45 sec. |
| Myoglobin, 10 mg./ml | Pos. 15 sec. | Pos. 15 sec. | Pos. 15 sec. | Pos. 30 sec. |
| Myoglobin, 5 mg./ml | Pos. 15 sec. | Pos. 30 sec. | Pos. 45 sec. | Neg. |
| Trypsinogen, 5 mg./ml | Pos. 15 sec. | Pos. 15 sec. | Pos. 30 sec. | Pos. 45 sec. |
| Trypsinogen, 2 mg./ml | Pos. 15 sec. | Pos. 15 sec. | Pos. 45 sec. | Neg. |
| Orgotein only | Pos. 15 sec. | Pos. 30 sec. | Pos. 45 sec. | Neg. |

From the data in Table X, it can be seen that these proteins potentiate the orgotein effect, in some cases more than in others even though they are completely void of any potentiating effect by themselves. The above systems are interesting examples of protein-protein interactions which occur at a pH quite far removed from their respective isoelectric points and at molarities of the order of $10^{-4}$.

Also investigated was whether two typical, buffer soluble, non-steroid anti-inflammatories, namely phenylbutazone and indomethacin would potentiate the RF latex agglutination test in the same way as orgotein. Molar amounts both well above and well below those found effective with orgotein were used. o-Phenanthroline was also tested because it is used in the final step of orgotein preparation to remove excess metal ions after chelation-saturation has been completed.

For the tests, both phenylbutazone and indomethacin were dissolved in 20 percent KOH and aliquots of these solutions were then diluted with saline-glycine buffer pH 8.2 to the appropriate concentration. Where necessary (1

TABLE IX

| Protein-buffer [1] (20 mg./ml.), latex reagent mixture (v./v.) 30 min. at 37° C. | Dilution of positive control | | | | |
|---|---|---|---|---|---|
| | 1:10 | 1:20 | 1:40 | 1:60 | 1:100 |
| Albumin, bovine serum | Neg. | Neg. | Neg. | | |
| Carboxypeptidase-B | Neg. | Neg. | Neg. | | |
| Deoxyribonuclease | Pos. 120 sec. | Neg. | Neg. | Neg. | |
| Myoglobin | Neg. | Neg. | Neg. | | |
| Pepsinogen | Pos. 120 sec. | Pos. 180 sec. | Neg. | Neg. | Neg. |
| Ribonuclease | Pos. 120 sec. | Neg. | Neg. | Neg. | |
| Trypsinogen | Pos. 60 sec. | Pos. 120 sec. | Neg. | Neg. | Neg. |
| Trypsin-inhibitor, soy | Pos. 60 sec. | Pos. 120 sec. | Pos. 150 sec. | Neg. | Neg. |
| Orgotein | Pos. 15 sec. | Pos. 15 sec. | Pos. 15 sec. | Pos. 15 sec. | Pos. 30 sec. |

[1] Saline-glycine buffer, pH 8.2.

From the data in Table IV, it is clear that the potentiating effect of orgotein on the RF latex agglutination test has a high degree of specificity, and is not a non-specific protein reaction.

The effect of the addition of the proteins listed in Table IX to orgotein buffer solutions, followed by incubation with an equal volume of latex reagent was then determined. Three different concentrations for each protein were used, i.e., 2, 5 and 10 mg./ml. were added to the latex-orgotein-buffer mixture. Orgotein concentration was nominally 10 mg./ml. in each case. Incubation was at 37° C. for 30 minutes. The addition of ribonuclease, carboxypeptidase-B, pepsinogen and trypsin inhibitor to the ormg./ml. and above), the pH of the solution was adjusted to about 9.0 with a few drops of concentrated HCl prior to dilution with buffer. In all cases the final pH was that of the buffer. o-Phenanthroline was used as such and dissolved directly in the saline-glycine buffer.

The data obtained was primarily of interest in showing potentiation of the RF test by both phenylbutazone and indomethacin although they extend only to 1:50 dilutions of the positive control, taking 45 seconds as the endpoint. Indomethacin lacks the concentration dependence of orgotein and shows identical potentiation over the surprisingly large concentration range of two orders of magnitude. Phenylbutazone and o-phenanthroline agglutinate the latex during room temperature incubation at concentrations of $10^{-4}$ M and above.

Example 4.—Use of orgotein and uncoated latex to detect RF in serum

A suspension of uncoated polystyrene latex particles was incubated with orgotein and used in lieu of 7-S human gamma-G globulin coated latex reagent in the RF agglutination test. The uncoated latex (0.15–0.25μ) was identical to the one used in the preparation of the latex reagent and otherwise corresponding to the coated latex used in commercially available test kits (Hyland Labs).

It contained 174,000 particles per ml., while the latex reagent used as control contained 168,000 particles per ml.

When used in the RF test after incubation at 37° C. for 30 minutes, the uncoated latex alone gave negative results at all dilutions (1:2 to 1:250) of the positive control. For the experiments, equal volumes of filtered orgotein solution (20 mg./ml.) in saline-glycine buffer pH 8.2 and uncoated latex suspension in the same buffer were put into test tubes and incubated at 37° C. for 30 minutes as well as at room temperature for 5 minutes. No agglutination was visible in the mixtures at the end of these periods. Controls with latex reagent were run in parallel. Table XI contains representative data obtained from these experiments.

TABLE XI

| Dilution | Agglutination times at various positive control dilutions, seconds | | | | |
|---|---|---|---|---|---|
|  | 1:25 | 1:50 | 1:100 | 1:150 | 1:250 |
| Orgotein uncoated latex; 23° C., 5 min | 60 | (¹) | (¹) | (¹) | (¹) |
| Orgotein uncoated latex; 37° C., 5 min | 30 | 45 | 60 | (¹) | (¹) |
| Orgotein latex reagent; 23° C., 30 min | 15 | 15 | 30 | 45 | (¹) |
| Orgotein latex reagent; 37° C., 30 min | 15 | 15 | 30 | 45 | (¹) |

¹ Negative.

The results demonstrate that when incubated with orgotein at 37° C. for five minutes, uncoated polystyrene latex will function as potentiator in the RF latex agglutination test nearly as well as latex coated with the human 7-S gamma-G globulin. Incubation at 23° C. for 5 minutes was not sufficient to bring about more than a slight activation. Therefore, 30 minutes at 37° C. is recommended.

It appears that coating of orgotein onto the latex is a prerequisite for potentiation. In the case of the globulin-coated latex, whether orgotein connects via the gamma-G globulin or coats directly onto open areas of the latex particles has not been established.

Example 5.—Quantitative determination of RF factor concentration in human serum using orgotein styrene latex As stated above, the test for RF factor using conventional gamma globulin coated styrene latex is semi-quantitative in nature. It is not fully quantitative because it is relatively insensitive to substantial differences in RF concentration in serum. Using orgotein coated latex, it is possible to detect and measure smaller differences in RF concentration than was heretofore possible. Below is shown typical concentrations of orgotein which must be mixed with an equal volume of standard styrene latex in order to render it coagulable within 45 seconds when mixed with a standard volume of serum containing varying amounts of RF factor (positive control=1.000).

| Concentration of RF in serum (positive control=1.000): | Concentration of orgotein required for serum to coagulate latex within 45 seconds, mg./ml. |
|---|---|
| 1.000 | 0.0 |
| 0.100 | 0.1 |
| 0.040 | 0.25 |
| 0.020 | 0.75 |
| 0.010 | 2 |
| 0.005 | 9 |
| 0.004 | 16 |

By determining the minimum concentration of orgotein which must be mixed with the latex in order for the RF in the unknown serum sample to coagulate the latex within 45 seconds, the concentration of RF factor relative to that in the positive control can be determined. To do this, mix aliquots of the unknown in the usual manner with aliquots of the latex which have been incubated in the manner described herein with like volumes of buffer solution containing varying known concentrations of orgotein. The most dilute concentration which produces a coated latex which coagulates within 45 seconds when mixed with the serum unknown can then be related to the minimum RF concentration of the positive control which also produces coagulation in 45 seconds with the latex mixture.

Because the sensitivity of various lots of the latex to RF factor vary somewhat, for the greatest accuracy, varying amounts of the positive control should be mixed with RF-free serum to provide positive controls containing varying known concentrations of RF. The RF concentrations of the unknown can then be equated to the RF concentration of the positive control which has the same orgotein-latex coagulability.

What is claimed is:

1. A rheumatoid factor coagulable diagnostic reagent comprising orgotein coated polystyrene latex, said latex having a particle size of less than one micron and selected from the group consisting of bare latex and 7-S gamma-G-globulin coated latex.

2. The orgotein-polystyrene latex diagnostic reagent of claim 1 wherein the polystyrene latex is a bare latex having a particle size of about 0.15 to 0.25 microns.

3. The orgotein-polystyrene latex diagnostic reagent of claim 1 wherein the polystyrene latex is a 7-S gamma-G globulin coated latex having a particle size of about 0.15 to 0.25 microns.

4. The organotein-polystyrene latex diagnostic reagent of claim 1 wherein the polystyrene latex is present in an amount by weight of from about 0.2% to about 0.5%.

5. In a method which comprises contacting a rheumatoid factor coagulable polystyrene latex with a rheumatoid factor, thereby coagulating the latex, the improvement which comprises employing for said latex the orgotein-polystyrene latex diagnostic reagent of claim 1.

6. The method of claim 5 wherein the polystyrene latex is a bare latex having a particle size of about 0.15 to 0.25 microns.

7. The method of claim 5 wherein the polystyrene latex is a 7-S gamma-G globulin coated latex having a particle size of about 0.15 to 0.25 microns.

8. In a method which comprises contacting a rheumatoid factor coagulable polystyrene latex with a rheumatoid factor, thereby coagulating the latex, the improvement which comprises measuring the rheumatoid factor coagulation sensitivity of the diagnostic reagent of claim 1 wherein the orgotein is a sample of orgotein of known activity and further measuring the rheumatoid factor coagulation sensitivity of an otherwise identical diagnostic reagent wherein the orgotein is a sample of orgotein of unknown biological activity.

9. The method of claim 8 which comprises contacting the diagnostic reagent in which the orgotein is the orgotein sample of unknown biological activity with standard rheumatoid factor-containing serum at varying dilution levels, and measuring the resulting coagulation times relative to the coagulation times of the diagnostic reagent wherein the orgotein is the orgotein sample of known activity when contacted with the standard rheumatoid factor-containing serum at the same dilutions.

10. In a method which comprises contacting a rheumatoid factor coagulable polystyrene latex with a rheumatoid factor, thereby coagulating the latex, the improvement which comprises measuring the coagulation times of the diagnostic reagent of claim 1 wherein the orgotein is a sample of orgotein of known biological activity, when mixed with aliquots of a serum sample of unknown rheumatoid factor content at various dilutions, relative to the coagulation times of the same diagnostic reagent when mixed with serum of known rheumatic factor content at the same dilutions.

References Cited
UNITED STATES PATENTS

| | | | |
|---|---|---|---|
| 3,088,875 | 5/1963 | Fisk | 424—12 |
| 3,658,982 | 4/1972 | Reiss | 424—12 |
| 3,579,495 | 5/1971 | Huber | 260—112 BX |
| 3,624,251 | 11/1971 | Huber | 260—112 BX |
| 3,637,640 | 1/1972 | Huber | 260—112 BX |
| 3,637,641 | 1/1972 | Huber | 424—177 |

ALBERT T. MEYERS, Primary Examiner

A. P. FAGELSON, Assistant Examiner

U.S. Cl. X.R.

424—101, 177; 260—112 B